United States Patent [19]

Shacklette

[11] Patent Number: 4,522,901
[45] Date of Patent: Jun. 11, 1985

[54] SECONDARY BATTERY CONTAINING ORGANOBORATE ELECTROLYTE

[75] Inventor: Lawrence W. Shacklette, Maplewood, N.J.

[73] Assignee: Allied Corporation, Morris Township, Morris County, N.J.

[21] Appl. No.: 556,721

[22] Filed: Nov. 30, 1983

Related U.S. Application Data

[63] Continuation-in-part of Ser. No. 475,995, Mar. 16, 1983, abandoned.

[51] Int. Cl.$^3$ .................................................. H01M 10/40
[52] U.S. Cl. ...................................... 429/194; 429/199; 429/212; 429/218
[58] Field of Search ............... 429/194, 196, 197, 101, 429/199, 46, 212, 218

[56] References Cited

U.S. PATENT DOCUMENTS

| | | | |
|---|---|---|---|
| 4,060,674 | 11/1977 | Klemann et al. | 429/194 |
| 4,104,451 | 8/1978 | Klemann et al. | 429/194 |
| 4,139,681 | 2/1979 | Klemann et al. | 429/191 |
| 4,279,976 | 7/1981 | Klemann et al. | 429/197 |
| 4,321,114 | 3/1982 | MacDiarmid et al. | 204/2.1 |

FOREIGN PATENT DOCUMENTS 0036118 9/1981 European Pat. Off.
0058469 8/1982 European Pat. Off.

Primary Examiner—Anthony Skapars
Attorney, Agent, or Firm—Alan M. Doernberg

[57] ABSTRACT

Secondary batteries with conjugated polymer anodes, such as polyacetylene, contain an electrolyte including a salt of the formula $MB_{4-w-y-z}R'_wR''_yX_z$ wherein M is an alkali metal, B is boron, R is alkyl, R' is aryl or alkyl-substituted aryl, R'' is heterocycle, X is F, Cl, Br, I, CN, OCN, SCN, fluoroaryl or perfluoroalkyl-substituted aryl, w and y are integers of 0 to 4, and z is an integer of 0 to 4, provided that when X is solely F, Cl, I, Br, CN, OCN, SCN or perfluororalkyl, Z is not 4; with the sum $x+y+z$ being equal to or less than 4. Exemplary salts are $LiBMe_4$, $LiBMe_2Ph_2$, $LiBMe_2PhPy$, $LiBMe_2Py_2$ and $KBPh_3SCN$ (where M=methyl, Ph=phenyl and Py=pyrrolyl). Cathodes such as conjugated backbone polymers (e.g. polyacetylene) and transition-metal chalcogenides (e.g. $TiS_2$) are disclosed. The battery can be charged to a state wherein the anode is in a reduced state of 0.1 V–0.5 V (relative to $M/M^+$) where a voltage plateau exists in some instances.

30 Claims, 4 Drawing Figures

SECONDARY BATTERY CONTAINING ORGANOBORATE ELECTROLYTE

BACKGROUND OF THE INVENTION

This is a continuation-in-part of Ser. No. 475,995, filed Mar. 16, 1983 now abandoned.

The present invention relates to polymeric secondary batteries, and especially to such batteries having an anode containing a conjugated backbone polymer and having an electrolyte comprising an alkali metal salt.

U.S. Pat. No. 4,321,114 to MacDiarmid et al. discloses secondary batteries containing as either the anode-active or cathode-active material a conjugated backbone polymer such as polyacetylene. In another version of said application, European Patent Application No. 36,118 (Sept. 23, 1981) (corresponding to U.S. Ser. No. 220,496), several types (A–E) of batteries are disclosed on pages 32–36 employing conjugated polymers as anode and/or cathode. Types A, B and D contain polymeric anode which become n-doped with alkali metal cations. It is indicated elsewhere that ethers are the preferred electrolyte solvents when the anode is reduced with lithium, sodium or potassium. Various anions are indicated as suitable in the electrolyte including tetrafluoroborate. While various other salts and solvents have been disclosed as suitable electrolyte components in batteries containing lithium anodes and conjugated polymer cathodes, there is relatively little teaching in the art of materials suitable for use with polymeric anodes which become reduced (n-doped) with alkali metals, and especially electrolysis having high stability towards such reduced polymeric anodes.

U.S. Pat. Nos. 4,060,674, 4,104,451, 4,139,691, and 4,279,976 of Klemann et al. disclose complex alkali metal salts, such as lithium tetraalkylborates, as suitable for use in batteries containing alkali metal anodes (e.g. lithium anodes) and cathodes into which alkali metals are intercalated (e.g. titanium sulfide into which lithium cations are intercalated on discharging). In particular, U.S. Pat. No. 4,060,674 discloses tetraalkylborates (U.S. Pat. No. 4,104,451 tetraalkylborates and U.S. Pat. No. 4,104,450 borates with heteroatom substituents) in batteries having alkali metal as the anode-active material, while U.S. Pat. No. 4,279,976 discloses lithium alkyl/pseudohalide borates as electrolytes in various batteries, including especially batteries having an alkali metal as anode-active material. There is no suggestion, however, that such salts would be particularly suitable for use in conjugated polymer batteries; and, in fact, it would be expected that such large anions would be unsuitable for batteries in which it is desired for the anion to intercalate into a polymeric cathode.

BRIEF DESCRIPTION OF THE INVENTION

It has been discovered that certain alkali metal complex borate salts, when used as the electrolyte in secondary polymeric batteries, enable the polymeric anode to be stable with a high level of inserted alkali metal cations relative to other alkali metal salts. Accordingly, the present invention includes a secondary battery comprising:

(a) an electrolyte comprising a solution of a salt of the formula $MBR_{4-w-y-z}R'_wR''_yX_z$ wherein M is an alkali metal, R is alkyl, R' is aryl or alkyl-substituted aryl, R'' is a heterocycle (particularly a nitrogen containing heterocycle), X is F, Cl, Br, I, CN, OCN, SCN, perfluoroalkyl, fluoroaryl or perfluoroalkyl-substituted aryl and w and y are integers of 0 to 4 and z is an integer of 0 to 4, provided that when X is solely F, Cl, I, Br, CN, OCN, SCN or perfluoroalkyl, z is not 4; with the sum $w+y+z$ being equal to or less than 4;

(b) an anode containing a conjugated backbone polymer which, in a reduced state, has a potential of between about 0.1 V and about 0.5 V (relative to $M/M^+$) and (c) a cathode which is separated from the anode.

DETAILED DESCRIPTION OF THE INVENTION

Figure 1:
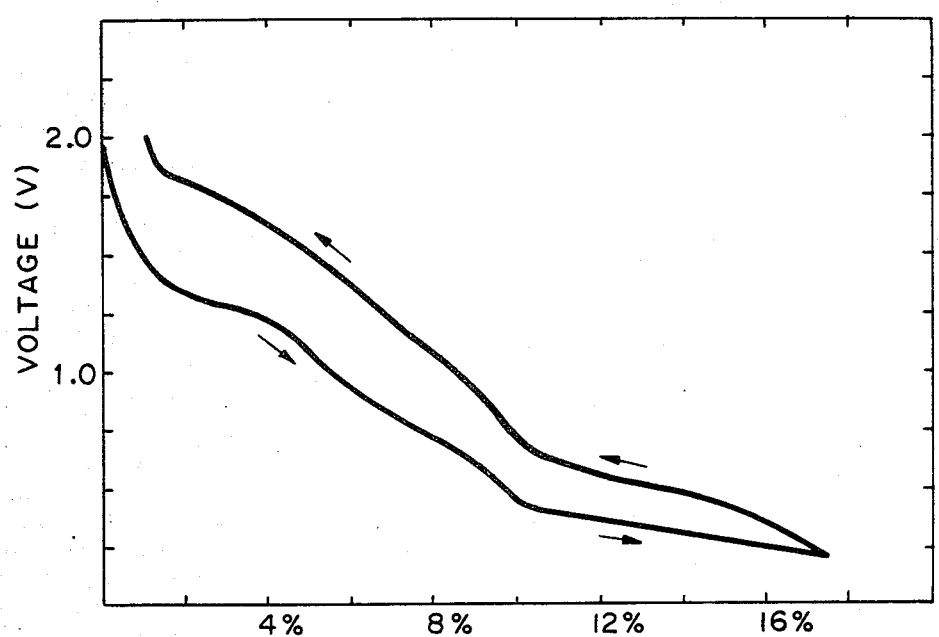
FIGS. 1, 2, 3 and 4 are discharge curves illustrating utilization of the instant invention.

The secondary batteries of the present invention contain an electrolyte comprising a solvent and an alkali metal salt, an anode containing a conjugated backbone polymer and a cathode. The solvent for the electrolyte may be any of various linear or cyclic ethers such as tetrahydrofuran (THF), 2-methyltetrahydrofuran (2-MeTHF), dioxolane, diethyl ether, dioxane, 1,2-dimethoxyethane, dimethoxymethane and diglyme. Mixtures of ethers, such as dimethoxyethane with THF or 2-MeTHF, may be used. Nonether solvents (inert under the operating conditions) such as tetraethylsulfonamide, methyl formate, dimethylsulfoxide, 3-methyl-2-oxazolidinone, 1-methyl-2-pyrrolidinone, dimethylformamide and hexamethylphosphoramide may also be used. The most preferred solvents are tetrahydrofuran and 2-methyltetrahydrofuran. The higher analogues of tetrahydrofuran (e.g. tetrahydropyran) may also be preferred.

The salt used in the present electrolyte can be indicated by the formula $MBR_{4-w-y-z}R'_wR''_yX_z$. In such formula M is an alkali metal, preferably lithium, sodium or potassium, with rubidium and cesium being less preferred. Lithium offers the advantage of light weight, but such lithium salts are generally more expensive than the corresponding sodium salts. Potassium and rubidium have the advantage of, when inserted into certain polymeric materials (e.g. polyacetylene), having enhanced conductivities after the treatments described in a co-pending, commonly assigned application of Delannoy et al., Ser. No. 475,996, filed Mar. 16, 1983. Accordingly, potassium is an additional preferred alkali metal for M. B in the above formula refers to the element boron. R in the above formula is alkyl such as methyl, ethyl, propyl, or butyl. R' in the above formula may be aryl such as phenyl or naphthyl, or may be alkyl-substituted aryl such as p-tolyl or xylyl. R'' is heterocyclic such as pyrrolyl or indoyl or alkyl-substituted forms thereof (the disclosure of U.S. Pat. No. 4,104,450 is incorporated herein by reference for such heterocycles). In some preferred forms of the invention, y and z are 0, such that there are no X or R'' groups. In other preferred forms of the invention y is 1 and z is 0, such that one X group is present, which may be F, Cl, Br, I, CN, OCN, SCN, perfluoroalkyl, fluoroaryl (either parafluoro or perfluoro) or perfluoroalkyl-substituted aryl (such as p-trifluoromethylphenyl).

In additional preferred forms of the invention, in which the cathode may be a polymer, w is 0 or 1, y is 0 or 1 and z is 3 or 4, with x being fluoroaryl, perfluoroalkyl-substituted aryl, and mixtures thereof with F. Examples include $LiBPh(p\text{-}F\text{-}Ph)_3$, $LiBF(per\text{-}F\text{-}Ph)_3$, LiB (per-F-Ph)$_4$, LiBF$_2$ (per-F-Ph)$_2$, LiBF$_3$(per-F-Ph), LiBF$_3$(p-F-Ph) and LiBF$_3$(p-CF$_3$-Ph), where Ph is phenyl, p-F-Ph is para-fluorophenyl, per-F-Ph is perfluorophenyl and p-CF$_3$-Ph is para-trifluoromethylphenyl. Generally when y>0 (heterocyclic substituents are employed), X will not be present (z=0). In most such cases y is preferably 1, 2 or 3.

A preferred substituent R″ is pyrrolyl, used preferably where z is 0 and y is at least 1. More preferably when R″ is pyrrolyl, y is 1, 2 or 3, as in LiBMe$_3$Py, LiBMe$_2$Py$_2$, LiBMePy$_3$, LiPh$_2$Py$_2$, LiMe$_2$PhPy, KBu$_3$Py, KMe$_3$Py or NaMe$_3$Py, where M is methyl, Ph is phenyl and Py is pyrrolyl. In general, X groups may increase the solubility of the salt and the conductivity of the electrolyte solution. Such X groups also increase the oxidative stability of the salt. In such cases where z is 1, X is preferably SCN, C$_6$F$_5$ (perfluorophenyl) or C$_6$H$_4$-p-F (parafluorophenyl).

Examples of salts which are especially preferred for use with reduced conjugated polymers when the cathode is a cation-inserting material whose fully-charged voltage does not exceed 2.5 V versus Li/Li$^+$ (such as TiS$_2$) include: LiBMe$_4$, LiBMe$_2$Ph$_2$, LiBMe$_2$PhPy, LiBMe$_2$Py$_2$, KBMe$_3$Py, and KBPh$_3$SCN (where Me=methyl, Ph=phenyl and Py=pyrrolyl).

The concentration of said salt in the solvent will depend somewhat upon the temperature of operation and other factors. Preferably, however, the salt is at a concentration where the conductivity of the electrolyte is near a maximum and below the concentration where the salt will precipitate as a result of any environmental conditions to which the battery is exposed.

The anode in the battery of the present invention is a conjugated backbone polymer which, in a reduced state, has a potential of between about 0.1 V and about 0.5 V (relative to the alkali metal pair M/M+). Two preferred polymers are polyacetylene and polyphenylene, with polyacetylene being slightly more preferred. Other suitable conjugated backbone polymers include polyphenylene, vinylene, polyazulene, polyphenylquinoline, polyacenediyls (such as polynaphthalenediyl and polyanthracenediyl) and other fused ring polyaromatics. It should be understood that the anode should be one having at least one reduced state in the range of 0.1 V to 0.5 V, and it is preferred that the secondary battery in at least one charged state have the anode in such reduced state. Some advantage can still be obtained, even if the anode does not have a *stable* charged stated in this low voltage range, since electrolyte stability in this range will allow the application of a larger overvoltage during charging. It should also be appreciated, however, that upon full charging, still lower voltages (as low as the voltage of the pair M/M+) may be achieved, and similarly, if the battery is only lightly charged, voltages may not reach levels below about 0.5 V. The polymer may be in the form of a powder or a free-standing film. The electrode may also contain additives to act as binders such as polypropylene, polytetrafluoroethylene (sold by DuPont as TEFLON ®) or poly(ethylene-chlorotrifluoroethylene (sold by Allied as HALAR ®) or to raise the conductivity such as carbon black (sold by Shawinigan products as Shawinigan Black ®).

The configuration of the polymer electrode may be of any desired type, including spirally wound, prismatic or bipolar prismatic.

The secondary batteries of the present invention are generally not limited with respect to the cathode material; provided, however, that the electrolyte is stable in contact with the cathode in both its charged and uncharged states. It is contemplated that, particularly with oxidatively stable small anions for the salt that a cathode which, in the charged state, has intercalated (inserted) anions may possibly be used as may be obtained with intercalation compounds of graphite and with conjugated polymers. It is preferred, however, to use a cathode which contains inserted alkali metal. One example of such cathodes is a conjugated backbone polymer which, in some instances, may be the same conjugated polymer used as the anode material. Thus, for example, if polyacetylene is both the anode and the cathode, the anode will be much more heavily doped (reduced) in the charged state than the cathode; in the uncharged state the anode and cathode may be equally doped with alkali metal cations, or the anode may be slightly more doped than the cathode. As illustrated by FIG. 1 and Example 1 below, polyacetylene has two generally flat voltage plateaus between reduction levels per CH of about 0.5 and 4% and between about 16 and 9%, or between 1.8–1.2 V and between 0.2–0.65 V, relative to Li/Li$^+$, such that a battery of substantially constant voltage can be made with the anode operating on the lower plateau and the cathode operating on the upper plateau. Using more conventional salts such as lithium tetrafluoroborate, a polyacetylene anode operating on the lower plateau would be unstable. As illustrated in Example 2, sodium-doped polyacetylene has two similar plateaus, between 1.0 and 0.85 V and between 0.05 and 0.5 V, relative to Na/Na$^+$ (1–5% and 13–9% reduction levels per CH).

Other examples of cathode materials useful in this invention which can contain inserted alkali metals include the transition metal chalcogenides such as TiS$_2$ and, among others, those listed on page 392 of "Lithium Batteries" edited by J. P. Gabano (Academic Press, 1983) and in K. M. Abraham, *Solid State Ionics*, vol. 7, pp. 199–212 (1982) (both incorporated herein by reference). These include (with approximate open circuit potentials when fully charged or devoid of inserted cations):

| | |
|---|---|
| Li$_x$MoO$_2$ | 1.6 V versus Li/Li$^+$ |
| Na$_x$VSe$_2$ | 1.7 V versus Na/Na$^+$ |
| Li$_x$NiPS$_3$ | 1.8 V versus Li/Li$^+$ |
| Li$_x$VSe$_2$ | 2.0 V versus Li/Li$^+$ |
| Na$_x$TiS$_2$ | 2.1 V versus Na/Na$^+$ |
| Na$_x$NbS$_2$Cl$_2$ | 2.2 V versus Na/Na$^+$ |
| Li$_x$Fe$_{0.25}$V$_{0.075}$S$_2$ | 2.4 V versus Li/Li$^+$ |
| Li$_x$TiS$_2$ | 2.5 V versus Li/Li$^+$ |
| LiMoS$_3$(amorphous) | 2.5 V versus Li/Li$^+$ |
| Na$_x$Cr$_{0.5}$V$_{0.5}$S$_2$ | |
| Na$_x$WO$_{3-y}$ | 2.6 V versus Na/Na$^+$ |
| Na$_x$MoS$_3$(amorphous) | 2.7 V versus Na/Na$^+$ |
| Na$_x$TaS$_2$ | 2.7 V versus Na/Na$^+$ |
| K$_x$WO$_{3-y}$ | |
| Li$_x$MoO$_3$ | 2.8 V versus Li/Li$^+$ |
| Li$_x$V$_6$O$_{13}$ | 2.9 V versus Li/Li$^+$ |
| Li$_x$Cr$_{0.5}$V$_{0.5}$S$_2$ | 2.9 V versus Li/Li$^+$ |
| Li$_x$W$_{0.2}$V$_{2.8}$O$_7$ | 3.0 V versus Li/Li$^+$ |
| Na$_x$CoO$_2$ | 3.3 V versus Na/Na$^+$ |
| Li$_x$Cr$_3$O$_8$ | 3.6 V versus Li/Li$^+$ |
| Li$_x$CoO$_2$ | 4.7 V versus Li/Li$^+$ |

LiBR$_4$ salts can be used with chalcogenides on the above list with open circuit voltages (OCV) up to approximately 2.5 V (versus Li/Li+), with those up to 2.2 V being likely to be more stable. Salts of the formulae LiBR$_2$R′$_2$, LiBR$_2$R″$_2$, LiBR$_2$X$_2$ can be used with chalcogenides on the above list with OCV up to approximately 2.8 V (versus Li/Li+) with those up to approximately 2.5 V being likely to be more stable. Salts of the formulae $LiBR'_4, LiBR'_3X$, $LiBR'_3R''$, $LiBR'_2R''_2$, $LiBR'_2R''X$, $LiBRR'_3$ or $LiBR''_4$ can be used with chalcogenides with OCV up to 3.1 V, with those up to 2.8 V being more likely to be stable. Above 3.0 V, the best electrolyte salts are those with three or four perfluoroaryls and/or fluorines.

EXAMPLES

Of the following examples, several (including 1, 2, 4, 5, 7, 9, 10 and 11) contain an alkali metal anode and a conjugated polymer cathode, such that they are outside the scope of the claim of the present invention. They illustrate, however, the stability and efficiency of conjugated polymers (as cathodes) in the voltage ranges (reduction levels) of anodes in the presently claimed batteries.

EXAMPLE 1

The salt, $LiB(C_6H_5)_4$, was prepared in tetrahydrofuran THF from $NaB(C_6H_5)_4$ (Aldrich Chemical Co.) by ion exchange from lithium-mercury amalgam. The salt was purified by recrystallization from THF. A battery was assembled with a lithium anode, a polyacetylene film cathode (6 mg) prepared by the method of Shirakawa, J. Pol. Sci., vol. 13, page 1943 (1975), and an electrolyte of approximately 0.25M $LiB(C_6H_5)_4$ in THF. The cell was discharged slowly at an average rate of 60 μA down to 0.2 V vs. Li/Li+, corresponding to a reduction level of ~17% for the PA, (i.e., a value of y=0.17 in the formula: $[(CH)^{-y}Li^{+}_y]_x$ and charged at an average rate of 70 μA up to 2 V. The coulombic efficiency (charge out on discharging divided by charge in on charging) over this cycle was 106%. Two main plateaus were evident in the charge/discharge characteristic (voltage vs. charge). A high voltage plateau was observed in the range 1.2 V (discharge) to 1.8 V (charge) corresponding to a range of reduction of the polyacetylene between 0.5 and 4%. A low voltage plateau was also observed between 0.2 V (discharge) and 0.65 V (charge) corresponding to a range of reduction between 16.4% and 9.4%. The third cycle is illustrated in FIG. 1, plotting voltage versus percent reduction of the polymer.

EXAMPLE 2

Figure 2:
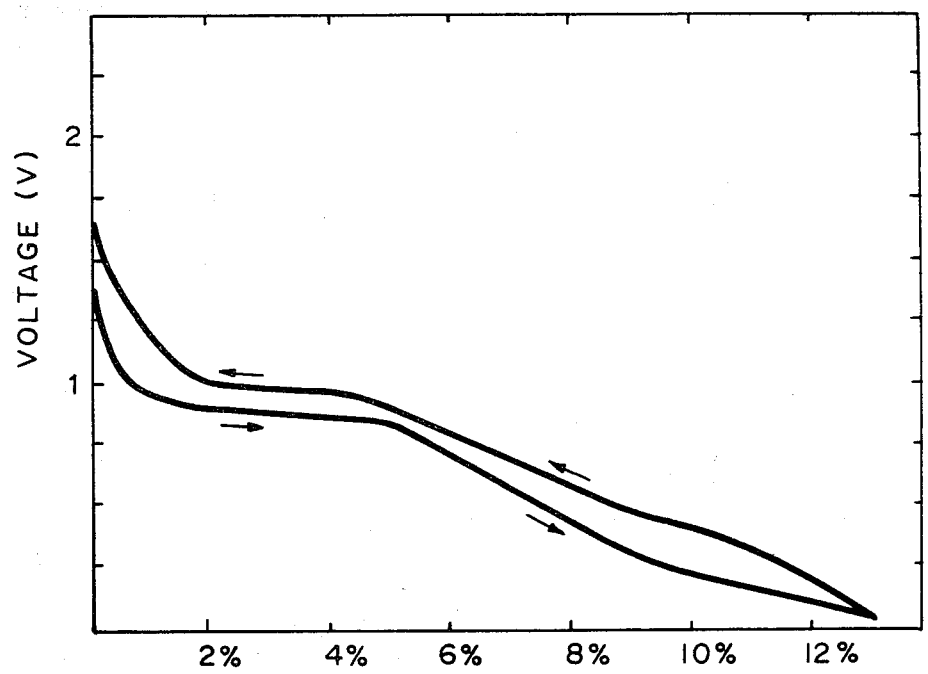

A cell similar to that in Example 1 was constructed with a sodium anode, a polyacetylene cathode, and an electrolyte of 0.25M $NaB(C_6H_5)_4$ in THF. The cell was cycled between 1.5 V and 0.05 V vs. Na/Na+ and again two plateaus were observed (upper plateau: 0.85 V (discharge) to 1.0 V (charge) for a degree of reduction, 1.2% to 5%; lower plateau: 0.05 V to 0.5 V for a degree of reduction, 13.2% to 9.2%. Much less charge/discharge hysteresis was observed in the voltage vs. capacity curves for this sodium cell, than was seen in the lithium cell of Example 1. Overall coulombic efficiency was essentially 100%. The third cycle is illustrated in FIG. 2 on a basis similar to FIG. 1.

EXAMPLE 3

Figure 3:
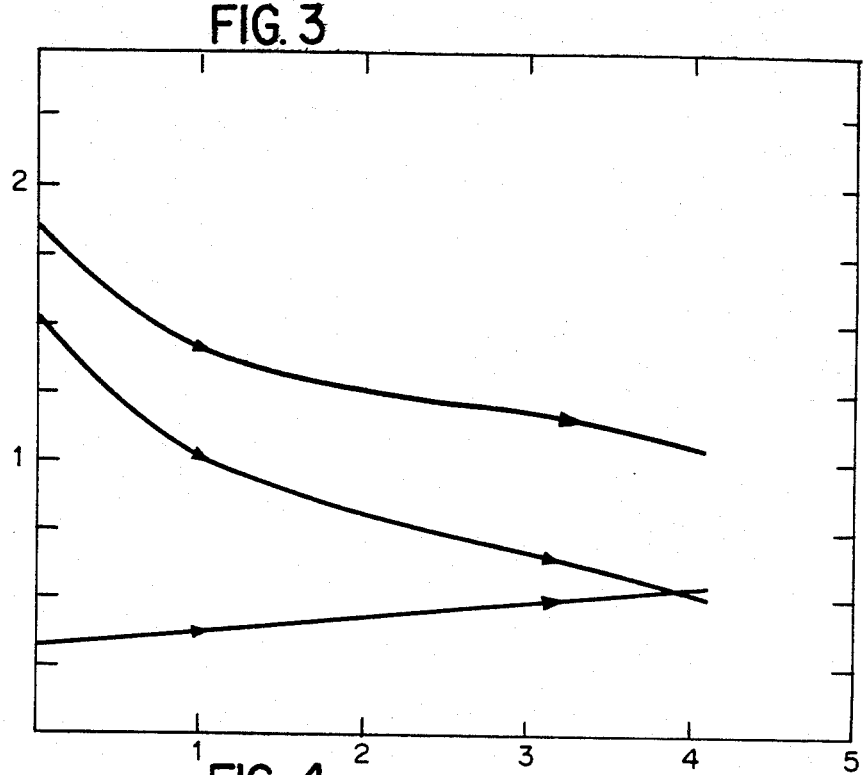

A cell was assembled with polyacetylene as both anode (8 mg) and cathode (4 mg) in 0.25M $LiB(C_6H_5)_4$ in THF. The anode was initially discharged vs. lithium to 0.3V (13% reduction). The cell was then cycled 10 times so that the cathode was being operated beteen 1.85 V and 1.05 V vs. Li/Li+ (i.e., over the upper voltage plateau, a change in degree of reduction of 4.1%) and the anode between 0.32 V and 0.53 V (i.e., over part of the lower plateau). The voltage of the cell varied between 1.53 V and 0.52 V. The capacity of the cathode declined by 5% over the 10 cycles. The overall coulombic efficiency was 93.4%. The minimum internal resistance for this one-cm$^2$ prismatic cell was 40Ω at its most discharged point (0.52 V). FIG. 3 shows the voltage (of the cathode, anode and difference therebetween) plotted versus percent reduction of the cathode for the battery on the third cycle.

EXAMPLE 4

A cell was assembled with a lithium anode, a poly (p-phenylene) cathode and an electrolyte of 0.25M $LiB(C_6H_5)_4$ in THF. The cathode consisted of 80% PPP powder (27.2 mg), 10% Shawinigan black, and 10% Halar as a binder. The cell was cycled 4 times down to a potential as low as 0.12 V vs. Li/Li+ (at an average current of 360 μA). The maximum reversible level of reduction observed for the PPP was 46% (i.e., 0.46 electrons per phenyl ring). The charge/discharge characteristic showed only one significant plateau extending from 0.5 V (discharge) to 0.95 V (charge) and encompassing a capacity range from 3% to 23% reduction. The coulombic efficiency over these cycles was 97%. The charge/discharge hysteresis was less than half of that observed for the polyacetylene in Example 1.

EXAMPLE 5

A cell was assembled with a sodium anode, a PPP cathode, and an electrolyte at 0.25M $NaB(C_6H_5)_4$ in THF. This cell was cycled down to 0.05 V vs. Na/Na+. The maximum level of reduction observed was 40% per phenyl. Again, only one plateau was observed lying between 0.20 V and 0.6 V vs. Na/Na+ corresponding to a degree of reduction from 4% to 30% per phenyl. Maximum hysteresis was half of that observed for Example 4 where lithium was used.

EXAMPLE 6

Figure 4:
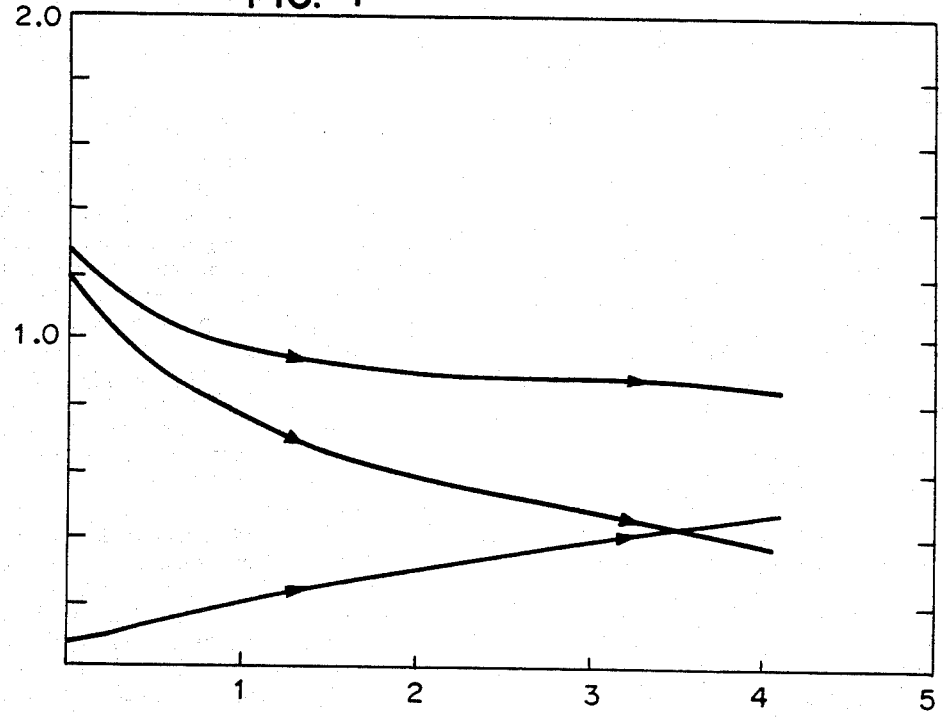

A battery was assembled as in Example 3 with polyacetylene film as both anode and cathode (5.5 mg of polyacetylene for each). Contact was made to each electrode with an expanded nickel grid. An electrolyte of 0.5M $NaB(C_6H_5)_4$ in THF was employed. A separate sodium metal electrode was added as a reference. Initially, both electrodes were discharged against the sodium electrode (reduced with Na) and then charged to remove all Na+. The cell was then conditioned by discharging the anode vs. the sodium metal electrode down to a voltage of 0.05 V vs. Na/Na+ (approximately a 15% reduction level). Then 20 cycles of PA anode vs. PA cathode in the voltage range 1.25 to 0.35 V were performed with the sodium electrode functioning to separately monitor the voltage of each polymer electrode. Results for the third discharge of the cell are given in FIG. 4 which presents the voltage of anode (lower curve) and cathode (upper curve) vs. Na/Na+ as well as anode vs. cathode (middle curve) as a function of the percent reduction of the cathode. Total coulombic efficiency over the first 10 cycles was 98.2%.

EXAMPLE 7

A cell was assembled with a lithium metal anode and a polyacetylene (PA) film cathode in an electrolyte of 1M lithium tetrabutylborate, $LiB(C_4H_9)_4$, in tetrahydrofuran. The cell was cycled between 2 V and 0.10 V vs Li/Li+ in 0.05 V steps with a minimum current of 50 μA/cm² at each step. Cycling was performed with essentially 100% coulombic efficiency. The degree of reduction of the PA varied from y=0 to y=0.16. Two plateaus were observed as in Example 1. The cell was then cycled over just the lower plateau (<0.6 V vs Li/Li+). A change in percent reduction ($\Delta$ y) of 9% was observed. Repeated cycling to successively lower potentials revealed that the electrolyte remained clear (i.e., undegraded) down to a potential of 0.06 V, but at a potential of 0.01 V, a dark blue coloration occurred as a result of irreversible reduction of the electrolyte on the reduced polyacetylene substrate.

Tests on a similar cell demonstrated that long cycle life may be achieved if voltage levels are maintained above a level where electrolyte reduction occurs. Over 80 cycles were achieved for a polyacetylene electrode operating in the range of 0.8 V to 0.2 V without significant loss of capacity.

Another essentially identical cell was assembled with a double layer of polyacetylene film (initial density approximately 0.4 g/cm³) wrapped by an expanded nickel grid. An electrolyte of 1.5M LiB($C_4H_9$)$_4$ in THF was employed. The rate capability of PA as an anode material was tested by charging the cell (removing lithium from PA) at a constant rate of 5 mA/cm² starting from a PA electrode potential of 0.1 V vs. Li/Li+ and a total reduction level of 18% (i.e., a stored charge of 1.85 mAh/cm²). The reduction level decreased to 9.6% (i.e., $\Delta$ y=0.084) by the time the PA electrode reached 0.75 V vs. Li/Li+. Thus, essentially half of the stored charged was removed at a potential below 0.75 V in approximately 10 minutes. Continued charging at 5 mA/cm² removed 73% of the stored charge ($\Delta$ y=0.132) up to a potential of 1.5 V.

Example 7 was substantially repeated using lithium tetrabutylborate in 2-methyltetrahydrofuran (2-MeTHF). With up to 16% total reduction level, the shape of the voltage versus reduction level curve differed from that generated in Example 7 and from FIG. 1 in having a generally lower voltage below 8% reduction level, a generally higher voltage above 8% reduction level, less overall slope and a less well defined lower plateau. This data suggests that the use of 2-MeTHF may be preferred for certain batteries of the present invention such as those with transition-metal chalcogenide or other higher voltage cathodes.

EXAMPLE 8

A cell was assembled with an anode of polyacetylene film (3 cm²) and a cathode of partially Li-intercalated TiS$_2$ (i.e., Li$_x$TiS$_2$). An electrolyte of 0.5M LiB($C_6H_5$)$_4$ in THF was employed. The cell was charged to 2.2 V. During charging, lithium was passed from TiS$_2$ cathode to PA anode. The PA at the end of charging was reduced to an average level, y=0.135 where y is defined by the expression [(CH)$^{-y}$Li$^+_y$]$_x$. During discharge of the cell from 2.2 V to 1.5 V the reduction level of PA changed by $\Delta$ y=0.054 (i.e., from y=0.135 to y=0.081). This cell was cycled 50 times.

Another similar cell was assembled using 1 cm² by 0.3 mm thick polyacetylene film weighing 25 mg (density=0.82 g/cm³). This anode was surrounded on both sides by a TiS$_2$ cathode (160 mg) and the cell was flooded with an electrolyte of 2M LiB($C_4H_9$)$_4$ in THF. The cell was charged to about 2.1 V and then discharged at various rates. Initially an average rate of 0.6 mA gave a capacity equivalent to $\Delta$ y=7% for a discharge down to 1.0 V (a 6-hour rate). Discharge at 6 mA gave a capacity equal to 70% of this value and discharge at 12 mA gave a capacity equal to 40%.

EXAMPLE 9

The salt K($C_6H_5$)$_3$BSCN was synthesized by reacting dried KSCN and B($C_6H_5$)$_3$ in dioxolane (as described in U.S. Pat. No. 4,279,976). A test cell was assembled with a polyacetylene (PA) working electrode, a K/Hg amalgam counter electrode, and a sodium reference. An electrolyte of 0.5M K($C_6H_5$)$_3$ BSCN in THF was employed. The PA was initially cycled between its neutral state and an 8% reduction level (y=0.08). Coulombic efficiency in this range was 100%. During reduction a very flat voltage plateau was observed at ca. 1.15 V vs. Na/Na+ up to a reduction level of y=0.055. When the current was reversed and the PA was returned to its neutral state, a flat plateau in voltage vs. y was observed at ca. 1.35 V. The PA was subsequently cycled to lower voltages and higher reduction levels. It was found that a partly reversible reduction of the electrolyte occurred on the PA electrode near a potential of 0.75 V vs. Na/Na+ as evidence by reversible color changes (clear to yellow and back to clear) in the electrolyte. The maximum reduction level of PA obtainable with this electrolyte was 14% (y=0.14).

EXAMPLE 10

A salt was prepared by reacting N-lithiopyrrole, Li($C_4H_4N$), and tributylborane, B($C_4H_9$)$_3$ in tetrahydrofuran in a manner analogous to that described in U.S. Pat. No. 4,104,450. Proton and boron NMR of the extracted salt produced in this reaction gave evidence for the salt LiB($C_4H_9$)$_3$($C_4H_4N$) with the predominant fraction having the pyrrole bonded at the N position. A smaller fraction of the salt (about 20%) had carbon-bonded pyrrole. There was also evidence for a small amount of LiB($C_4H_9$)$_4$.

This mixture of salts was dissolved in THF (1 Molar) and used as the electrolyte in a cell composed of a lithium anode and a polyacetylene film cathode. Both anode and cathode employed nickel grid current collectors. To test the stability of this electrolyte, this cell was cycled between 2.1 V and successively lower potentials vs the Li/Li+ reference. Results are given in the table below where coulombic efficiency is defined as (charge on charge)/(charge on discharge) and relates to the efficiency with which PA may be reduced.

| Cycle No. | Min. Voltage vs. Li/Li+ | Max. % Reduction of PA | Coulombic Efficiency |
|---|---|---|---|
| 1 | 0.5 V | 9.9% | 100.1% |
| 2 | 0.2 V | 15.8% | 98.5% |
| 3 | 0.1 V | 17.7% | 102% |

The electrolyte remained clear during each of these cycles. The electrolyte is evidently stable to highly reduced polyacetylene down to a potential of 0.1 V or less vs. Li/Li+.

EXAMPLE 11

A salt was prepared by reacting methyl lithium, LiCH$_3$, and trimethyl borate, B(CH$_3$)$_3$, in diethyl ether according to the method described in U.S. Pat. No. 4,060,674.

The diethyl ether was removed under vacuum until a white powder remained. A solution was made by adding tetrahydrofuran (THF) distilled from sodium benzophenone to the white powder. A reaction occurred and a yellow solution was obtained. The THF was removed under vacuum, and the yellow solids which remained were washed with pentane until only a white powder remained. NMR analysis of this white product was consistent with a composition: $LiB(CH_3)_4 \cdot 2THF$. This product was again dissolved in THF, this time, forming a clear solution. The electrolyte solution was finally stirred over a Li/Hg amalgam to remove any remaining reactive impurities. This electrolyte solution was then used to construct a battery composed of a lithium anode, a nonwoven glass separator, and a polyacetylene film cathode. After an initial cycle down to a voltage of about 1 V, the battery was charged to 2.1 V and then slowly cycled down to 0.15 and back to 2.1 V in 0.05 Volt steps. Plateaus in the relation between voltage and degree of PA reduction observed for this cell were essentially the same as those described in Example 1.

The maximum reduction level of the polyacetylene observed at 0.15 V vs $Li/Li^+$ was 17%. The coulombic efficiency over this cycle was 100.0%. Subsequent cycles to higher reduction levels (lower voltages) demonstrated coulombic efficiency near 100% down to 0.1 V but at 0.05 V vs $Li/Li^+$ cycling became inefficient presumably due to instability of $BMe_4^-$ or THF or both. The maximum stable reduction level of the polyacetylene observed with this electrolyte was 18.5% at 0.1 V versus $Li/Li+$ (i.e. 0.38 Ah/g of PA).

In order to test the long term stability of heavily reduced polyacetylene in this electrolyte, the cell was again discharged to 0.2 V and held at this potential for 24 h; at this point, the current was 5 mA and the PA had been reduced to a 16% level. The cell was then allowed to stand at open circuit for 10 days at which point the open-circuit voltage had risen to 0.32 V. Upon recharge 98% of the original charge was recovered indicating that heavily reduced polyacetylene is stable in a $LiBMe_4$/THF electrolyte for long periods.

EXAMPLE 12

Potassium hydride and pyrrole were reacted in THF to form $K(C_4H_4N)$. A stoichiometric amount of tributyl borane, $B(C_3H_9)_3$ was then added to form the salt, potassium tributyl(N-pyrrolyl)borate, $KB(C_4H_9)_3(C_4H_4N)$. The THF was removed under vacuum and 2-methyltetrahydrofuran was added to form a 0.7 molar solution. A battery containing this electrolyte was assembled with a potassium metal anode enclosed in a polypropylene separator (sold as Celgard ®2500 by Celanese), a glass filter paper absorber, and a polyacetylene (PA) film cathode (6 mg). After an initial cycle which reduced the polyacetylene to a maximum extent of 8%, the cell was cycled between 1.8 V and 0.25 V in 0.05 V steps allowing the current to relax to 50 µA between steps. Two distinct plateaus were observed in the discharge characteristic (cell voltage vs reduction level of PA). A high voltage plateau was observed in the range 1.28 V (minimum during discharge) to 1.53 V (maximum during charge) corresponding to a range of reduction of the PA between 0.5 and 5.4%. A lower plateau was also observed in the range 0.95 (discharge) to 1.28 V (charge) corresponding to reduction levels between 6.5% and 11%. The plateaus associated with the charging of the cell (i.e., the discharging of a cell if PA were to be used as the anode material) were especially flat. On charging, the onset of the lower plateau occurred at 1.25 V (10.5% reduction) and the end of the upper plateau occurred at 1.53 V (0.5% reduction). The capacity of the polyacetylene in this range from 1.25 V to 1.53 V was 0.21 Ah/g. In subsequent cycles the cell was found to give high coulombic efficiency (>98%) when discharged to potentials as low as 0.1 V (versus $K/K^+$) where the reduction level of the polyacetylene was 17% (0.35 Ah/g of PA).

EXAMPLE 13

A cell was assembled with an anode of polyacetylene film, a cathode of partially lithiated $TiS_2$, a potassium metal reference electrode, and an electrolyte of 0.4M $LiB(C_4H_9)_3(C_4H_4N)$ and 0.4M $KB(C_4H_9)_3(C_4H_4N)$ in 2Me-THF. Initially the $Li_xTiS_2$ electrode and the PA electrode were cycled separately against the $K/K^+$ reference. The initial voltage of the partially lithiated $TiS_2$ was 2.49 V vs $K/K^+$. This electrode was discharged down to 1.9 V vs $K/K^+$ and displayed a discharged curve (voltage vs x, where x is defined by $Li_xTiS_2$) which was typical of lithium intercalation in $TiS_2$ but not of potassium. On the other hand, the polyacetylene electrode displayed a voltage characteristic (voltage vs % PA reduction) which was identical to that for potassium insertion described in Example 12. Evidentally lithium is selectively inserted into $TiS_2$ while potassium is selectively inserted into polyacetylene. The polyacetylene electrode was found to be stable in this electrolyte down to a potential of 0.1 V vs $K/K^+$ (17% reduction). The cell composed of $[(CH)^{-0.17}K^+_{0.17}]$ vs $Li_{0.3}TiS_2$ displayed on open-circuit voltage of 2.39 V and was cycled five times without significant loss of capacity to indicate that this configuration constitutes a secondary battery.

What is claimed:

1. A secondary battery comprising:
   (a) an electrolyte comprising a solution of a salt of the formula $$MBR_{4-w-y-z}R'_wR''_yX_z$$

wherein M is an alkali metal, B is boron R is alkyl, R' is aryl or alkyl-substituted aryl, R" is a heterocycle, X is F, Cl, Br, I, CN, OCN, SCN, perfluoroalkyl, fluoroaryl or perfluoroalkyl-substituted aryl and w and y are integers of 0 to 4, and z is an integer of 0 to 4, provided that when X is solely F, Cl, I, Br, CN, OCN, SCN or perfluoroalkyl, z is not 4; with the sum w+y+z being equal to or less than 4;
   (b) an anode containing a conjugated backbone polymer which, in a reduced state, has a potential of between about 0.1 V and about 0.5 V (relative to $M/M^+$) and
   (c) a cathode which is separated from the anode.

2. The secondary battery of claim 1 wherein y and z are 0.

3. The secondary battery of claim 2 wherein M is Li.

4. The secondary battery of claim 2 wherein M is Na.

5. The secondary battery of claim 2 wherein R' is phenyl and w is at least 1.

6. The secondary battery of claim 2 wherein R is alkyl of 1-4 carbon and 4−w−y−z is at least 1.

7. The secondary battery of claim 1 wherein z is 1 and y is 0.

8. The secondary battery of claim 7 wherein X is selected from the group consisting of F, SCN, OCN and CN.

9. The secondary battery of claim 8 wherein R' is phenyl and w is 3.

10. The secondary battery of claim 8 wherein said anode contains polyacetylene.

11. The secondary battery of claim 2 wherein said anode contains polyacetylene.

12. The secondary battery of claim 1 wherein said anode contains polyacetylene.

13. The secondary battery of claim 1 wherein said anode contains polyphenylene.

14. The secondary battery of claim 1 wherein said anode and said cathode each contain reduced polyacetylene, with said anode being polyacetylene reduced by incorporation of alkali metal cations to a greater degree than said cathode in the charged state.

15. The secondary battery of claim 14 wherein, in the charged state, said anode is at a potential between about 0.1 V and about 0.5 V, relative to $M/M^+$, and said cathode is at a potential between about 1.5 V and about 2.0 V, relative to $Li/Li^+$.

16. The secondary battery of claim 1 wherein the salt is dissolved in an inert organic ether solvent.

17. The secondary battery of claim 1 wherein the salt is dissolved in tetrahydrofuran.

18. The secondary battery of claim 1 wherein the salt is dissolved in 2-methyltetrahydrofuran.

19. The secondary battery of claim 1 wherein the cathode comprises a transition-metal chalcogenide into which alkali-metal cations are inserted during discharging.

20. The secondary battery of claim 19 wherein said transition-metal chalcogenide is $TiS_2$.

21. The secondary battery of claim 20 wherein M is Li.

22. The secondary battery of claim 19 wherein the electrolyte comprises a mixture of salts of said formula, being a salt with M being Li and a salt with M being K.

23. The secondary battery of claim 1 wherein y and z are each 0.

24. The secondary battery of claim 23 wherein w is 0.

25. The secondary battery of claim 24 wherein R is alkyl of 1–4 carbons.

26. The secondary battery of claim 25 wherein w is 4.

27. The secondary battery of claim 26 wherein R' is phenyl.

28. The secondary battery of claim 1 wherein y is at least 1 and R'' is pyrrolyl.

29. The secondary battery of claim 28 wherein z is 0 and y is 1, 2 or 3.

30. The secondary battery of claim 1 wherein z is 3 or 4, and x is F, fluoroaryl or perfluoroalkylaryl.

* * * * *